(12) United States Patent
Sakata

(10) Patent No.: US 9,918,055 B2
(45) Date of Patent: Mar. 13, 2018

(54) POLARIZATION CONVERTING ELEMENT, LIGHT SOURCE DEVICE, LIGHTING DEVICE, AND PROJECTOR

(71) Applicant: SEIKO EPSON CORPORATION, Tokyo (JP)

(72) Inventor: Hidefumi Sakata, Tatsuno-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/391,448

(22) Filed: Dec. 27, 2016

(65) Prior Publication Data

US 2017/0195645 A1 Jul. 6, 2017

(30) Foreign Application Priority Data

Jan. 6, 2016 (JP) .................. 2016-001267

(51) Int. Cl.
 *G03B 21/20* (2006.01)
 *H04N 9/31* (2006.01)
 (Continued)

(52) U.S. Cl.
 CPC ............ *H04N 9/3167* (2013.01); *F21K 9/64* (2016.08); *F21V 5/007* (2013.01); *F21V 5/04* (2013.01);
 (Continued)

(58) Field of Classification Search
 CPC ............... G03B 21/204; G03B 21/206; G03B 21/2073; G03B 21/208; G03B 21/2066; H04N 9/3158; H04N 9/3167; F21K 9/64; G02B 5/04; G02B 5/3083; G02B 27/1006; G02B 27/283
 See application file for complete search history.

(56) References Cited

U.S. PATENT DOCUMENTS 6,478,430 B2 11/2002 Wada
7,529,024 B1 * 5/2009 Chen .................. G02B 27/28
 353/20
(Continued)

FOREIGN PATENT DOCUMENTS

JP 2008-203293 A 9/2008
JP 2011-090321 A 5/2011
(Continued)

*Primary Examiner* — William C Dowling
*Assistant Examiner* — Ryan Howard
(74) *Attorney, Agent, or Firm* — Oliff PLC

(57) ABSTRACT

A polarization conversion element includes: a polarization separation layer which emits first polarized light among incident light and second polarized light which is different from the first polarized light in different directions, respectively; a color separation layer which reflects first colored light among incident light and transmits second colored light which is different from the first colored light, and reflects the first polarized light and one light ray among the second polarized light emitted from the polarization separation layer in substantially the same direction as the direction of the other polarized light emitted from the polarization separation layer; and a retardation layer which is disposed on an optical path of any of the one polarized light and the other polarized light and converts a polarization direction of incident light.

13 Claims, 6 Drawing Sheets

(51) Int. Cl.
  *G02B 27/28*  (2006.01)
  *G02B 27/10*  (2006.01)
  *F21K 9/64*  (2016.01)
  *G02B 5/04*  (2006.01)
  *G02B 5/30*  (2006.01)
  *F21V 5/00*  (2018.01)
  *F21V 5/04*  (2006.01)
  *G02B 26/00*  (2006.01)

(52) U.S. Cl.
  CPC ............. *G02B 5/04* (2013.01); *G02B 5/3083* (2013.01); *G02B 26/008* (2013.01); *G02B 27/1006* (2013.01); *G02B 27/283* (2013.01); *G03B 21/204* (2013.01); *G03B 21/208* (2013.01); *G03B 21/2066* (2013.01); *H04N 9/3114* (2013.01); *H04N 9/3158* (2013.01)

(56) References Cited

U.S. PATENT DOCUMENTS

| | | |
|---|---|---|
| 8,678,596 B2 | 3/2014 | Sakata et al. |
| 8,690,343 B2 | 4/2014 | Tanaka |
| 8,998,421 B2 | 4/2015 | Akiyama et al. |
| 9,323,045 B2 | 4/2016 | Sakata et al. |
| 2015/0153020 A1* | 6/2015 | Akiyama ............ G03B 21/2073 353/20 |

FOREIGN PATENT DOCUMENTS

| | | |
|---|---|---|
| JP | 2011-197212 A | 10/2011 |
| JP | 2012-133337 A | 7/2012 |
| JP | 2013-182207 A | 9/2013 |

* cited by examiner

POLARIZATION CONVERTING ELEMENT, LIGHT SOURCE DEVICE, LIGHTING DEVICE, AND PROJECTOR

BACKGROUND

1. Technical Field

The present invention relates to a polarization conversion element, a light source device, a lighting device, and a projector.

2. Related Art

In the related art, a projector which modulates illumination light emitted from a light source device to form an image in accordance with image information and enlarges and projects the image on a projection surface such as a screen or the like has been known (for example, see JP-A-2011-197212).

The projector disclosed in JP-A-2011-197212 includes a lighting device, a color separation device, a light modulation device, a light combining device, and a projection optical device. Among these, the lighting device includes a solid-state light source device, a condensing optical system, a rotation fluorescent plate, a motor, a collimate optical system, a first lens array, a second lens array, a polarization conversion element, and a superimposing lens. In this lighting device, light emitted from the solid-state light source device is concentrated by the condensing optical system and is incident to the rotation fluorescent plate rotated due to the motor. The light incident to the rotation fluorescent plate is emitted from the rotation fluorescent plate as fluorescent light and becomes light collimated by the collimate optical system, and the light is incident to the polarization conversion element via the first lens array and the second lens array. This polarization conversion element has a configuration in which a plurality of polarization separation layers and a plurality of reflecting layers are alternately arranged along one direction in a plane orthogonal to an optical axis, and light having polarization directions aligned by the polarization conversion element is superimposed by the superimposing lens and emitted from the lighting device as illumination light.

However, the polarization conversion element of the projector disclosed in JP-A-2011-197212 has a configuration in which polarization separation layers and reflecting layers are alternately arranged along one direction in a plane orthogonal to an optical axis as described above, and thus, the configuration is complicated.

SUMMARY

An advantage of some aspects of the invention is to provide a polarization conversion element, a light source device, a lighting device, and a projector having a simplified configuration.

A polarization conversion element according to a first aspect of the invention includes: a polarization separation layer which separates incident light into first polarized light and second polarized light which is different from the first polarized light and emits first polarized light and second polarized light in different directions, respectively; a color separation layer which reflects first colored light among incident light and transmits second colored light which is different from the first colored light, and reflects one polarized light among the first polarized light and the second polarized light emitted from the polarization separation layer in substantially the same direction of the other polarized light among the first polarized light and the second polarized light emitted from the polarization separation layer; and a retardation layer which is disposed on an optical path of the one polarized light or the other polarized light and converts a polarization direction of incident light.

According to the first aspect, the second colored light incident to the color separation layer is transmitted through the color separation layer and reflected by the polarization separation layer. In this case, when the first colored light including the first polarized light and the second polarized light is incident to the polarization separation layer, any one of the first polarized light and the second polarized light included in the first colored light is transmitted through the polarization separation layer and the other light is reflected by the polarization separation layer, incident to the color separation layer, and further reflected by the color separation layer. Since the retardation layer is disposed at the position described above, the polarization direction of any one polarized light of the first polarized light and the second polarized light transmitted through the polarization separation layer which are included in the first colored light or the polarization direction of the other polarized light of the first polarized light and the second polarized light reflected by the polarization separation layer and the color separation layer which are included in the first colored light is converted by passing through the retardation layer. With the polarization conversion element, it is possible to emit the first colored light configured with any polarized light of the first polarized light and the second polarized light.

According to such a configuration, since the polarization conversion element can be configured with the color separation layer, the polarization separation layer, and the retardation layer one by one, it is possible to simplify the configuration of the polarization conversion element.

A polarization conversion element according to a second aspect of the invention includes: a color separation layer which reflects first colored light among incident light and transmits second colored light which is different from the first colored light; a polarization separation layer which reflects first polarized light among incident light and transmits second polarized light which is different from the first polarized light; and a retardation layer which converts a polarization direction of incident light, in which the color separation layer, the polarization separation layer, and the retardation layer are provided one by one, the color separation layer and the polarization separation layer are disposed in series in a first direction and are inclined to the same side with respect to the first direction, respectively, and the retardation layer is disposed on an optical path of the first polarized light emitted from the polarization separation layer, the second polarized light emitted from the polarization separation layer, or the first colored light emitted from the color separation layer.

According to the second aspect, it is possible to exhibit the following effects.

According to the second aspect of the invention, in a case where the first colored light is fluorescent light, the second colored light is blue light, the first polarized light is s-polarized light, and the second polarized light is p-polarized light, for example, blue light (second colored light) incident to the color separation layer is transmitted through the color separation layer and reflected by the polarization separation layer. When the first colored light (fluorescent light) including the s-polarized light (first polarized light) and the p-polarized light (second polarized light) is incident to the polarization separation layer, the p-polarized light included in the first colored light is transmitted through the polarization separation layer, and the s-polarized light is reflected by the polarization separation layer and incident to the color separation layer along the first direction. The s-polarized light of the first colored light is reflected by the color separation layer. Since the retardation layer is disposed at the position described above, one of the polarized light of the p-polarized light transmitted through the polarization separation layer which is included in the first colored light and the s-polarized light reflected by the polarization separation layer and the color separation layer which is included in the first colored light, is converted into the other polarized light by passing through the retardation layer. With such a polarization conversion element, it is possible to emit the first colored light configured with any of the p-polarized light and the s-polarized light in the same direction.

According to such a configuration, since the polarization conversion element can be configured with the color separation layer, the polarization separation layer, and the retardation layer one by one, it is possible to simplify the configuration of the polarization conversion element.

In the second aspect, it is preferable that the first direction follows an optical path of the first polarized light incident to the color separation layer from the outside and is a travelling direction of the first polarized light, and the polarization separation layer is disposed in the first direction with respect to the color separation layer and reflects the first polarized light incident along the first direction in a second direction orthogonal to the first direction.

According to the second aspect with this configuration, the blue light (second colored light) incident to the color separation layer is transmitted through the color separation layer and reflected by the polarization separation layer in the second direction. When the first colored light (fluorescent light) including the p-polarized light and the s-polarized light is incident to the polarization separation layer in the second direction, the p-polarized light included in the first colored light is transmitted through the polarization separation layer in the direction opposite to the second direction, and the s-polarized light is reflected by the polarization separation layer and incident to the color separation layer along the first direction. The s-polarized light of the first colored light is reflected by the color separation layer to the side opposite to the second direction and travels in the direction opposite to the second direction. Since the retardation layer is disposed at the position described above, one of the polarized light of the p-polarized light transmitted through the polarization separation layer which is included in the first colored light and the s-polarized light reflected by the polarization separation layer and the color separation layer which is included in the first colored light, is converted into the other polarized light by passing through the retardation layer. With such a polarization conversion element, it is possible to emit the first colored light having the p-polarized light or the s-polarized light in the direction opposite to the second direction. According to such a configuration, since the polarization conversion element can be configured with the color separation layer, the polarization separation layer, and the retardation layer one by one, it is possible to further simplify the configuration of the polarization conversion element.

In the second aspect, it is preferable that the color separation layer and the polarization separation layer are formed in a prism.

According to the second aspect with this configuration, since the color separation layer, the polarization separation layer, and the retardation layer can be integrally formed using the prism, it is possible to easily perform the disposition of the polarization conversion element.

In the second aspect, it is preferable that the prism includes a first prism in which the color separation layer is positioned, and a second prism in which the polarization separation layer is positioned, a surface of the first prism on a side opposite to the first direction is an incidence surface to which at least the second colored light is incident, a surface of the second prism in the second direction is an incidence and emission surface from which the first polarized light reflected by the polarization separation layer among the second colored light which is transmitted through the color separation layer and incident to the polarization separation layer is emitted to the outside and to which the first colored light is entered, surfaces of the first prism and the second prism on a side opposite to the second direction are emission surfaces from which the first polarized light and the second polarized light included in the first colored light are emitted, and the retardation layer is positioned on the emission surface of any of the first prism and the second prism.

According to the second aspect with this configuration, the incidence surface, the incidence and emission surface, and the emission surface are set on the first prism and the second prism as described above, and accordingly, it is possible to define a direction of light incident to the polarization conversion element and a direction of light emitted from the polarization conversion element. Therefore, it is possible to easily handle the polarization conversion element.

A light source device according to a third aspect of the invention includes: the polarization conversion element described above; an excitation light source which emits excitation light incident to the color separation layer; a wavelength conversion element which includes a phosphor which receives the excitation light which is transmitted through the polarization separation layer, reflected by the polarization separation layer, and emitted to the outside of the polarization conversion element and generates fluorescent light.

As the excitation light source, a light emitting diode (LED) can be exemplified, in addition to a laser light source which emits blue light. As the phosphor, the YAG phosphor can be exemplified.

According to the third aspect, it is possible to exhibit the same effects as those of the polarization conversion element according to the first aspect. By using the polarization conversion element described above, it is possible to simplify the configuration of the light source device, compared in a case where the components are provided separately.

In a case where the light source device according to the second aspect is used, it is preferable that the fluorescent light is incident to the polarization separation layer along a direction opposite to the second direction. According to such a configuration, among the first polarized light and the second polarized light which are included in the fluorescent light and incident to the polarization separation layer to be separated, the first polarized light reflected by the polarization separation layer is further reflected by the color separation layer, and emitted in the same direction as that of the second polarized light transmitted through the polarization separation layer, and thus, the fluorescent light can be widely emitted.

A light source device according to a fourth aspect of the invention includes: the polarization conversion element described above, an excitation light source which emits excitation light incident to the color separation layer; a wavelength conversion element which includes a phosphor which receives the excitation light which passes through the color separation layer, reflected by the polarization separation layer, and emitted to the outside of the polarization conversion element and generates fluorescent light; and a first wavelength plate which is disposed between the polarization separation layer of the polarization conversion element and the wavelength conversion element and converts any of the incident first polarized light and the second polarized light from linearly polarized light into substantially circularly polarized light, in which the fluorescent light is incident to the polarization separation layer along a direction opposite to the second direction.

In the fourth aspect, in a case where a polarization component of the first polarized light reflected by the polarization separation layer is s-polarized light, for example, linearly polarized light is converted into substantially circularly polarized light rotating to the right or left (for example, to the left) and incident to the wavelength conversion element, when the light initially passes through the first wavelength plate. The blue light converted into the fluorescent light and blue light which is not converted into the fluorescent light among the first polarized light are reflected by the wavelength conversion element as the first colored light, and are incident to the first wavelength plate again, as substantially circularly polarized light rotating in a direction opposite to the above right or left direction (for example, to the right). In this case, since the fluorescent light is a random polarized light having the p-polarized light and the s-polarized light, the fluorescent light is converted from the substantially circularly polarized light into the linearly polarized light when the fluorescent light passes through the first wavelength plate, and is incident to the polarization conversion element as the linearly polarized light having the p-polarized light component and the s-polarized light component. Meanwhile, the blue light is converted from the substantially circularly polarized light into linearly polarized light to be incident to the polarization conversion element as the linearly polarized light having the p polarization.

According to this, since the polarization direction of the blue light can be rotated by 90°, the blue light can be emitted from the emission surface of the prism where the polarization separation layer of the polarization conversion element is disposed. In the case where the retardation layer is disposed on the emission surface side of the second prism, the blue light having the p polarization component and the fluorescent light having the p polarization component transmitted through the polarization separation layer are emitted as the blue light and the fluorescent light having the s polarization component, and the fluorescent light having the s polarization component reflected by the polarization separation layer is reflected by the color separation layer and emitted. Meanwhile, in a case where the retardation layer is disposed on the emission surface side of the first prism, the blue light and the fluorescent light having the p polarization component are emitted from the polarization conversion element. That is, according to the second aspect, the blue light can be emitted from only the emission surface of the second prism, and polarization directions of the emitted blue light and the fluorescent light can be aligned.

In the fourth aspect, it is preferable that the wavelength conversion element includes a phosphor layer which includes the phosphor, and a reflecting layer which reflects incident light which is transmitted through the phosphor layer, and some rays of the first polarized light are diffused and reflected by at least any of the surface of the phosphor layer on a side opposite to the reflecting layer, the inside of the phosphor layer, the surface of the phosphor layer on the reflecting layer side, and the reflecting layer, and are emitted as blue light together with the fluorescent light.

As the shape described above, a shape having a plurality of projections and recesses can be exemplified.

According to the fourth aspect with the configuration described above, the polarized light incident to the phosphor layer is emitted from the phosphor layer as the blue light and the fluorescent light. According to this, it is possible to efficiently generate fluorescent light from excitation light emitted from a solid light source. In addition, it is possible to effectively use excitation light emitted from a solid light source without causing blue light to be incident from a different incidence surface.

In the fourth aspect, it is preferable that the light source device further includes: a blue light source which is disposed on a side opposite to the excitation light source with the polarization conversion element interposed therebetween and emits blue light towards a surface facing the incidence surface of the polarization conversion element; and a diffusion plate which receives the blue light and diffuses the blue light, and the wavelength conversion element includes a second incidence surface to which the blue light diffused by the diffusion plate is incident.

Here, in a case where the blue light source is an LD, light travels on a straight line, and accordingly, the light is incident to the second incidence surface of the polarization conversion element as dots, and the blue light is included in only some rays of the emitted light from the polarization conversion element.

With respect to this, according to the fourth aspect, the blue light is incident to the second incidence surface of the polarization conversion element in a state where the blue light emitted from the blue light source is diffused. According to this, even when some rays of the polarized light incident to the wavelength conversion element is not emitted as the blue light, it is possible to reliably emit blue light and fluorescent light from the polarization conversion element.

In the fourth aspect, it is preferable that the light source device further includes: a diffusion reflection unit which diffuses and reflects the second polarized light which is transmitted through the polarization separation layer and emitted to the outside of the polarization conversion element; and a second wavelength plate which is disposed between the polarization conversion element and the diffusion reflection unit, and converts the second polarized light from linearly polarized light into substantially circularly polarized light.

For example, in a case where a polarization component of the second polarized light transmitted through the polarization separation layer is the p polarization component, the light is converted from linearly polarized light into substantially circularly polarized light rotating to the right or left (for example, to the left) and incident to the diffusion reflection unit, when the light initially passes through the second wavelength plate. The light is reflected by the polarization separation layer in a state where the second polarized light (blue light) is diffused, and is incident to the second wavelength plate again, as substantially circularly polarized light rotating in a direction opposite to the above right or left direction (for example, to the right). In this case, the second polarized light (blue light) is converted from the substantially circularly polarized light into the linearly polarized light, and accordingly the light is incident to the polarization conversion element as linearly polarized light having s polarization. The second polarized light incident to the polarization conversion element is reflected by the polarization separation layer in the direction opposite to the second direction. Therefore, even when the blue light source which emits blue light is not provided, it is possible to reliably emit blue light and fluorescent light from the emission surfaces.

In the fourth aspect, it is preferable that the polarization conversion element includes a phosphor wheel obtained by forming the phosphor layer including the phosphor and the diffusion reflection unit on the same base material, and a reflecting layer which reflects the second polarized light towards the phosphor wheel, and the second polarized light incident to the diffusion reflection unit of the phosphor wheel is reflected by the diffusion reflection unit and incident to the polarization separation layer through the reflecting layer.

According to the fourth aspect with this configuration, the first polarized light and the second polarized light of the excitation light incident to the polarization conversion element are emitted in the second direction and both of the polarized light are incident to the polarization conversion element from the direction described above again, as fluorescent light and the diffused blue light. According to this, it is possible to miniaturize the light source device, compared to a case where the diffusion reflection unit which diffuses the second polarized light is provided in a travelling direction of the second polarized light.

A lighting device according to a fifth aspect of the invention includes: the light source device described above; and a homogenization device which homogenizes illuminance in plane orthogonal to a center axis of light incident from the light source device, in which the homogenization device includes an afocal lens which enlarges and emits a beam system of light incident from the light source device, a first lens array in which a plurality of first lenses are arranged in plane orthogonal to a center axis of a light flux incident through the afocal lens and which divides the incident light flux into a plurality of partial light fluxes using the plurality of first lenses, a second lens array in which a plurality of second lenses corresponding to the plurality of first lenses are arranged in the orthogonal plane and which superimposes the plurality of partial light fluxes on an area to be lit using the plurality of second lenses, and a superimposing lens which superimposes the light incident through the second lens array.

According to the fifth aspect, it is possible to exhibit the same effects as those of the light source devices according to the third aspect and the fourth aspect. It is possible to miniaturize the light source device, and therefore, it is possible to miniaturize the lighting device.

A projector according to a sixth aspect of the invention includes: the lighting device described above; a light modulation device which modulates light incident from the lighting device; and a projection optical device which projects light modulated by the light modulation device.

According to the sixth aspect, it is possible to exhibit the same effects as those of the lighting device according to the fifth aspect. It is possible to miniaturize the lighting device, and therefore, it is possible to miniaturize the projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to the drawings.
Schematic Configuration of Projector FIG. 1 is a schematic view showing a schematic configuration of a projector 1 according to the first embodiment.

The projector 1 is a display apparatus which modulates light flux emitted from a light source provided therein to form an image in accordance with image information and enlarges and projects the image on a projection screen such as a screen SC1.

Figure 1:
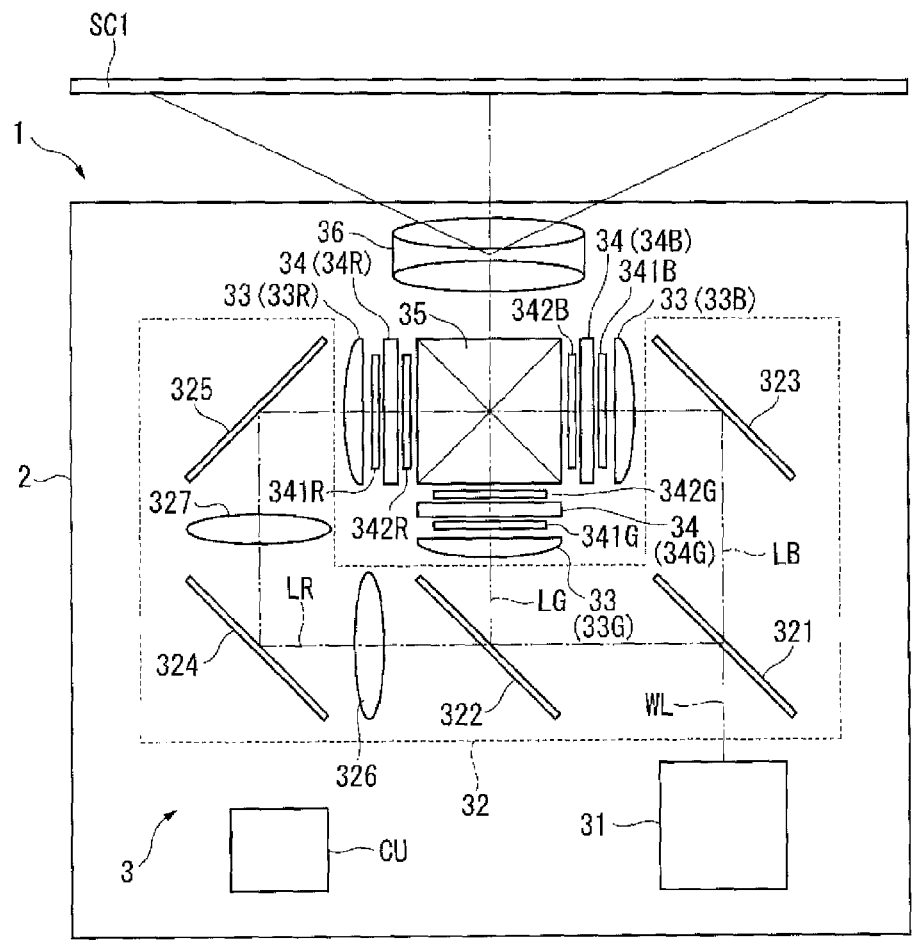
FIG. 1 is a schematic view of a projector according to a first embodiment of the invention.

As shown in FIG. 1, the projector 1 includes an external housing 2, an optical unit 3 which is accommodated in the external housing 2, and a control device CU which controls the projector 1. Although not shown, the projector further includes a cooling device which cools a target to be cooled and a power source device which supplies electric power to an electronic component configuring the projector 1.
Configuration of Optical Unit The optical unit 3 includes a lighting device 31, a color separation device 32, a collimating lens 33, a plurality of light modulation devices 34, a color combining device 35, and a projection optical device 36.

The lighting device 31 emits illumination light WL. The configuration of the lighting device 31 will be described later.

The color separation device 32 separates the illumination light WL emitted from the lighting device 31 into three colored light of red light LR, green light LG, and blue light LB. The color separation device 32 includes dichroic mirrors 321 and 322, total reflection mirrors 323, 324, and 325, and relay lenses 326 and 327.

The dichroic mirror 321 separates the illumination light WL from the lighting device 31 into blue light LB and yellow light LY containing other colored light rays (green light LG and red light LR). The dichroic mirror 321 reflects the blue light LB and transmits the yellow light LY containing the green light LG and the red light LR.

The dichroic mirror 322 separates the yellow light LY which is one of the light rays separated by the dichroic mirror 321 into green light LG and red light LR. Specifically, the dichroic mirror 322 reflects the green light LG and transmits the red light LR.

The total reflection mirror 323 is disposed in the middle of an optical path of the blue light LB and reflects the blue light LB reflected by the dichroic mirror 321 towards the light modulation device 34 (34B). Meanwhile, the total reflection mirrors 324 and 325 are disposed in the middle of an optical path of the red light LR and reflects the red light LR transmitted through the dichroic mirror 322 towards the light modulation device 34 (34R). The green light LG is reflected by the dichroic mirror 322 towards the light modulation device 34 (34G).

The relay lenses 326 and 327 are disposed on the optical path of the red light LR which is a downstream side of the dichroic mirror 322. The relay lenses 326 and 327 have a function of compensating light loss of the red light LR due to a longer length of the optical path of the red light LR than a length of an optical path of the blue light LB or the green light LG.

The collimating lens 33 collimates light incident to the light modulation device 34 which will be described later. The collimating lenses for red, green, and blue light are denoted with reference numerals 33R, 33G, and 33B. The light modulation devices for red, green, and blue light are denoted with reference numerals 34R, 34G, and 34B.

The plurality of light modulation devices 34 (34R, 34G, and 34B) modulates incident colored light rays LR, LG, and LB separated by the dichroic mirror 321 and the dichroic mirror 322 to form a colored image in accordance with image information. Each light modulation device 34 is configured with a liquid crystal panel which modulates incident light.

Incidence side polarizing plates 341 and emission side polarizing plates 342 are respectively disposed on incidence sides and emission sides of the light modulation devices 34R, 34G, and 34B. The incidence side polarizing plates for red, green, and blue light are denoted with reference numerals 341R, 341G, and 341B and emission side polarizing plates for red, green, and blue light are denoted with reference numerals 342R, 342G, and 342B.

Image light rays from the light modulation devices 34R, 34G, and 34B are incident to the color combining device 35. The color combining device 35 combines image light rays corresponding to the colored light rays LR, LG, and LB and emits the combined image light towards the projection optical device 36. In this embodiment, the color combining device 35 is configured with a cross dichroic prism.

The projection optical device 36 projects the image light combined by the color combining device 35 on a projection surface such as the screen SC1. With such a configuration, an image is projected on the screen SC1.

Configuration of Lighting Device

Figure 2:
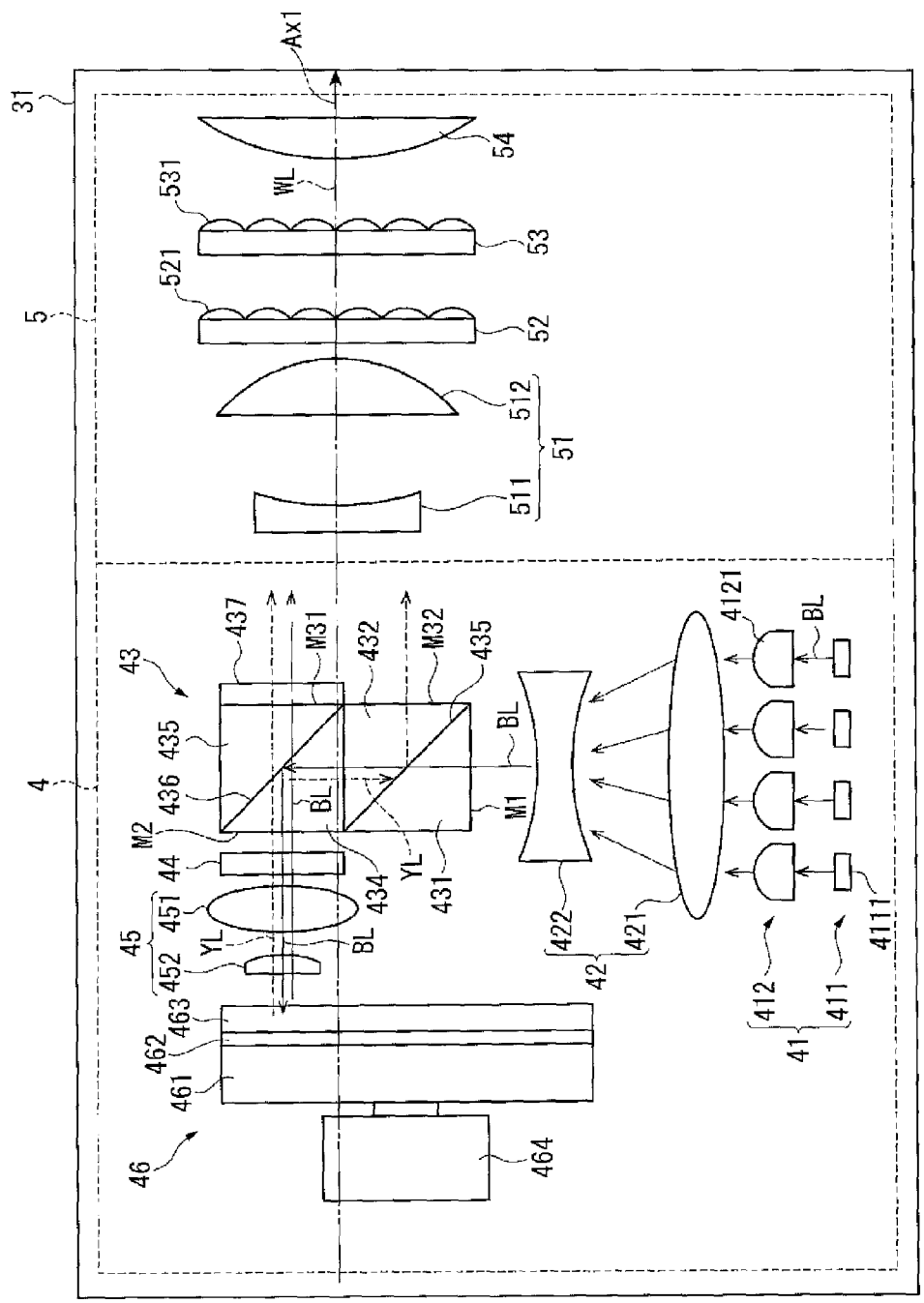
FIG. 2 is a schematic view of a lighting device of the projector according to the first embodiment.

FIG. 2 is a schematic view showing the configuration of the lighting device 31 of the projector 1 of this embodiment.

The lighting device 31 emits the illumination light WL towards the color separation device 32 as described above. As shown in FIG. 2, the lighting device 31 includes a light source device 4 and a homogenization device 5. The light source device 4 emits blue light and fluorescent light towards the homogenization device 5 and the homogenization device 5 homogenizes the incident blue light and fluorescent light and emits the light rays to the color separation device 32 as the illumination light WL.

Configuration of Light Source Device

Among these components, the light source device 4 includes a light source unit 41, an afocal lens 42, a polarization conversion element 43, a retardation plate 44, a pickup lens 45, and a wavelength conversion element 46.

Configuration of Light Source Unit

The light source unit 41 includes an array light source 411 and a collimator optical system 412. The array light source 411 is configured with a plurality of semiconductor lasers 4111 corresponding to excitation light sources according to the invention. Specifically, the array light source 411 is formed of the plurality of semiconductor lasers 4111 which are arranged in one plane orthogonal to a light flux emitted from the array light source 411 in an array form.

The semiconductor lasers 4111 configuring the array light source 411 emit excitation light (blue light BL) having a peak wavelength in a wavelength range of 445 nm, for example. The blue light BL emitted from the semiconductor lasers 4111 is linearly polarized light aligned in s polarization and is emitted towards the afocal lens 42. The blue light BL emitted from the array light source 411 is incident to the collimator optical system 412.

The collimator optical system 412 converts the blue light BL emitted from the array light source 411 into parallel light. The collimator optical system 412 includes a plurality of collimator lenses 4121 which are arranged in an array form to correspond to the semiconductor lasers 4111, for example. The blue light BL which is converted into the parallel light by passing through the collimator optical system 412 is incident to the afocal lens 42.

The afocal lens 42 adjusts a light flux diameter of the blue light BL incident from the collimator optical system 412. The afocal lens 42 includes a lens 421 and a lens 422. The blue light BL is concentrated by the lens 421, parallelized by the lens 422, and is incident to the polarization conversion element 43.

Configuration of Polarization Conversion Element

The polarization conversion element 43 has a function of aligning polarization directions of the incident light. The polarization conversion element 43 includes a first prism 431, a second prism 432, a third prism 433, a fourth prism 434, a color separation layer 435, a polarization separation layer 436, and a retardation layer 437. That is, polarization conversion element 43 includes the color separation layer 435, the polarization separation layer 436, and the retardation layer 437 one by one, and the layers are integrally formed by the first to fourth prisms 431 to 434.

The first to fourth prisms 431 to 434 are formed in a triangular prism shape and the first prism 431 and the second prism 432 are disposed so that inclined surfaces oppose each other. The color separation layer 435 is disposed between the first prism 431 and the second prism 432.

The third prism 433 and the fourth prism 434 are disposed to oppose each other so that the inclined surfaces have the same angles as those of the inclined surfaces of the first prism 431 and the second prism 432. The polarization separation layer 436 is disposed between the third prism 433 and the fourth prism 434. That is, the color separation layer 435 and the polarization separation layer 436 are disposed in the same direction to be inclined by 45° with respect to an optical axis of the blue light BL emitted from the light source unit 41. That is, the color separation layer 435 and the polarization separation layer 436 are disposed on an optical path of the blue light BL incident to the color separation layer 435 from the outside of the polarization conversion element 43 and are disposed in the first to fourth prisms 431 to 434 on the same side to be inclined with respect to a travelling direction (first direction) of the blue light BL.

In addition, the retardation layer 437 is fixed to the fourth prism 434. Further, the second prism 432 and the third prism 433 are fixed to each other with an adhesive or the like (not shown). With such a configuration, the polarization conversion element 43 includes the color separation layer 435, the polarization separation layer 436, and the retardation layer 437 one by one, and the layers are integrally formed by the first to fourth prisms 431 to 434.

The first prism 431 and the second prism 432 correspond to the first prism according to the invention and the third prism 433 and the fourth prism 434 correspond to the second prism according to the invention.

The polarization conversion element 43 includes an incidence surface M1 to which the blue light BL emitted from the light source unit 41 is incident. The incidence surface M1 is a surface of the first prism 431 on the light source unit 41 side and the blue light BL is incident through the first prism 431. The blue light BL emitted from the incidence surface M1 of the first prism 431 is incident to the color separation layer 435 through the first prism 431.

The color separation layer 435 transmits blue light BL (second colored light) in a first wavelength range (for example, 440 nm to 460 nm) among the blue light BL incident from the incidence surface M1 and reflects blue light BL (first colored light) in a second wavelength range (for example, wavelength range higher than 460 nm) in a direction (second direction) orthogonal to an incidence direction of the blue light BL. In this embodiment, the color separation layer 435 is configured with the dichroic mirrors.

In this embodiment, since the semiconductor lasers 4111 configuring the array light source 411 emit excitation light (blue light BL) having a peak wavelength in a wavelength range of 445 nm, the blue light BL is substantially transmitted through the color separation layer 435.

The blue light BL transmitted through the color separation layer 435 is incident to the polarization separation layer 436 through the second prism 432 and the third prism 433.

The polarization separation layer 436 reflects blue light BL having an s polarization component corresponding to first polarized light according to the invention and transmits blue light BL having a p polarization component corresponding to second polarized light according to the invention. Since the blue light BL emitted from the light source 41 is blue light BL aligned in s polarization, the blue light BL is substantially reflected by the polarization separation layer 436.

The blue light BL reflected by the polarization separation layer 436 is emitted from an incidence and emission surface M2 which is a surface of the third prism 433 in the second direction to the wavelength conversion element 46 (retardation plate 44) through the third prism 433.

Although the details will be described later, the blue light BL is emitted to the incidence and emission surface M2, and also fluorescent light YL which is obtained by the conversion of the wavelength conversion element 46 into the fluorescent light YL and diffused blue light BL which is not converted into the fluorescent light YL by the wavelength conversion element 46 are incident to the incidence and emission surface again.

The retardation layer 437 has a function of rotating a polarization direction of the incident light by 90°. The retardation layer 437 is disposed on a side opposite to the second direction with respect to the polarization separation layer 436, that is, on the fourth prism 434. Accordingly, the polarization direction of the light incident through the polarization separation layer 436 and the fourth prism 434 is rotated by 90° by the retardation layer 437.

The retardation plate 44 is disposed between the polarization conversion element 43 and the wavelength conversion element 46 and the incident blue light BL having the s polarization component is converted from linearly polarized light into substantially circularly polarized light rotating to the right or left. In this embodiment, the retardation plate 44 is configured with a λ/4 wavelength plate. The retardation plate 44 corresponds to a first wavelength plate according to the invention.

The blue light BL incident to the retardation plate 44 is incident to the pickup lens 45 provided between the retardation plate 44 and the wavelength conversion element 46, in a state of being converted into the substantially circularly polarized light.

The pickup lens 45 includes a lens 451 and a lens 452 and concentrates light incident to the lenses 451 and 452. Accordingly, the blue light BL is incident to the wavelength conversion element 46 in a state of being concentrated by the pickup lens 45.

Configuration of Wavelength Conversion Element

The wavelength conversion element 46 is disposed at a position facing the incidence and emission surface M2 and includes a base material 461, a reflecting layer 462, a phosphor layer 463, and a motor 464. The base material 461 is formed in a substantially disc shape and the reflecting layer 462 is formed on the surface of the base material 461 on the polarization conversion element 43 side. The phosphor layer 463 is formed on the surface of the reflecting layer 462 on the polarization conversion element 43 side. The phosphor layer 463 and the reflecting layer 462 have fine unevenness.

The motor 464 is attached to the base material 461 and the base material 461 rotates by the driving of the motor 464. Accordingly, the phosphor layer 463 is cooled.

Among these, the phosphor layer 463 is, for example, a wavelength conversion element containing YAG phosphor and some rays of the blue light BL incident to the phosphor layer 463 are emitted as the fluorescent light YL containing red light LR and green light LG. Some rays of the blue light BL are scattered in the phosphor layer 463 or transmitted through the phosphor layer 463, as the blue light BL without being converted into the fluorescent light YL. Specifically, some rays of the blue light BL are diffused and reflected by the surface of the phosphor layer 463 on a side opposite to the reflecting layer 462, the inside of the phosphor layer 463, the surface of the phosphor layer 463 on the reflecting layer 462 side, and the reflecting layer 462, to be emitted as the blue light BL together with the fluorescent light YL. Accordingly, the fluorescent light YL and the blue light BL are reflected by the phosphor layer 463 or the reflecting layer 462 towards the pickup lens 45.

The fluorescent light YL converted by the phosphor layer 463 is emitted with a random polarization direction, and therefore, the fluorescent light YL has both polarization components of the p polarization component and the s polarization component.

The fluorescent light YL and the blue light BL emitted from the wavelength conversion element 46 are concentrated by the pickup lens 45 and incident to the retardation plate 44. Accordingly, the rotation direction of the blue light BL is reversed by the reflecting layer 462, the blue light is incident to the retardation plate 44, and the polarization direction thereof is converted from substantially circularly polarized light into linearly polarized light. Accordingly, blue light BL reflected by the reflecting layer 462 is emitted as blue light BL having the p polarization component. The blue light BL and the fluorescent light YL are incident to the polarization separation layer 436 through the incidence and emission surface M2 again.

As described above, in regard to the fluorescent light YL and the blue light BL incident through the incidence and emission surface M2, the blue light BL is incident to the polarization separation layer 436 through the third prism 433. As described above, since the blue light BL is blue light BL having the p polarization component, the blue light is emitted from an emission surface M31 of the fourth prism 434 through the polarization separation layer 436 and the fourth prism 434.

In regard to the fluorescent light YL, the fluorescent light YL having the p polarization component is transmitted through the polarization separation layer 436, and is emitted from the emission surface M31 of the fourth prism 434 through the fourth prism 434, in the same manner as the blue light BL.

Meanwhile, in regards to the fluorescent light YL, the fluorescent light YL having the s polarization component is reflected by the polarization separation layer 436. The fluorescent light YL reflected by the polarization separation layer 436 is incident to the color separation layer 435 through the third prism 433 and the second prism 432. Then, the fluorescent light is reflected by the color separation layer 435 and is emitted from an emission surface M32 of the second prism 432.

The blue light BL having the p polarization component and the fluorescent light YL having the p polarization component emitted from the emission surface M31 are incident to the retardation layer 437. The blue light BL and the fluorescent light YL having the p polarization component incident to the retardation layer 437 are emitted from the retardation layer 437 as the blue light BL and the fluorescent light YL having the s polarization component.

That is, the blue light BL emitted from the light source unit 41 is converted into the blue light BL and the fluorescent light YL having the s polarization component and emitted from the emission surfaces M31 and M32 through the polarization conversion element 43 and the wavelength conversion element 46. That is, the fluorescent light YL and the blue light BL having an aligned polarization direction are emitted towards the homogenization device 5 from the substantially entire surface of the polarization conversion element 43 facing the homogenization device 5.

Configuration of Homogenization Device

The homogenization device 5 has a function of homogenizing the blue light BL and the fluorescent light YL emitted from the light source device 4. As shown in FIG. 2, The homogenization device 5 includes an afocal device 51, a first lens array 52, a second lens array 53, and a superimposing lens 54.

Among these components, the afocal device 51 has a function of enlarging a beam system of the fluorescent light YL and the blue light BL incident from the polarization conversion element 43. Specifically, the afocal device 51 adjusts a size of a light source image displayed on the second lens 531 of the second lens array 53 based on the fluorescent light YL and the blue light BL incident through the light source device 4.

The afocal device 51 is configured with an afocal lens formed of a concave lens 511 and a convex lens 512. The concave lens 511 diffuses the incident fluorescent light YL and blue light BL and emits the light rays towards the convex lens 512. The convex lens 512 parallelizes the fluorescent light YL and the blue light BL diffused and incident from the concave lens 511 and emits the light rays towards the first lens array 52.

The first lens array 52 includes a plurality of first lenses 521 which are arranged in an array form in a plane orthogonal to a center axis (illumination light axis Ax1) of light (light flux) emitted from the afocal device 51. The first lens array 52 divides the light flux incident to the first lens array 52 into a plurality of partial light fluxes by the plurality of first lenses 521 of the first lens array 52.

The second lens array 53 includes a plurality of second lenses 531 which are arranged in an array form in a plane orthogonal to the illumination light axis Ax1 and correspond to the plurality of first lenses 521 of the first lens array 52. The second lens array 53 superimposes partial light flux divided by the first lenses 521 on the superimposing lens 54 as an area to be lit, by the plurality of second lenses 531.

The first lens array 52 and the second lens array 53 are configured with the same shape, that is, the same member. Light transmitted through such first lens array 52 and second lens array 53 is emitted towards the superimposing lens 54.

The superimposing lens 54 homogenizes illuminance distribution of the area to be lit by superimposing the illumination light WL in the area to be lit. As described above, the fluorescent light YL and the blue light BL are combined by the superimposing lens 54 and emitted from the lighting device 31 towards the dichroic mirrors 321 as the illumination light WL having the homogenized illuminance distribution.

Effects of First Embodiment

In the projector 1 according to this embodiment described above, the following effects are exhibited.

In this embodiment, the color separation layer 435 transmits the blue light BL (excitation light) at a wavelength lower than a predetermined wavelength and reflects colored light at a wavelength equal to or longer than the predetermined wavelength. The polarization separation layer 436 reflects the blue light BL having the s polarization component and transmits the blue light BL having the p polarization component.

In the polarization conversion element 43, the blue light BL incident to the color separation layer 435 is transmitted through the color separation layer 435 and reflected by the polarization conversion element 43 in the second direction. When the fluorescent light YL containing s-polarized light and p-polarized light is incident to the polarization separation layer 436 from the second direction, the fluorescent light YL having the p polarization component is transmitted through the polarization separation layer 436 in the opposite direction of the second direction and the fluorescent light YL having the s polarization component is reflected by the polarization separation layer 436 and is incident to the color separation layer 435 along the first direction. The fluorescent light YL having the s polarization component is reflected to the side opposite to the second direction by the color separation layer 435. Since the retardation layer 437 is disposed at the position described above, the blue light BL and the fluorescent light YL having the p polarization component transmitted through the polarization separation layer 436 which are included in the first colored light (fluorescent light) are converted into first polarized light, that is, blue light and fluorescent light having the s polarization component, by being transmitted through the retardation layer 437. The blue light BL and the fluorescent light YL having the s polarization component can be emitted to the opposite direction (same direction) of the second direction by the polarization conversion element 43. According to such a configuration, since the polarization conversion element 43 can be configured with the color separation layer 435, the polarization separation layer 436, and the retardation layer 437 one by one, it is possible to simplify the configuration of the polarization conversion element 43.

Since the color separation layer 435 and the polarization separation layer 436 are formed in the first to fourth prisms 431 to 434, the color separation layer 435, the polarization separation layer 436, and the retardation layer 437 can be integrally formed by the first to fourth prisms 431 to 434, and thus, it is possible to easily dispose the polarization conversion element 43.

The surface of the first prism 431 on a side opposite to the first direction is the incidence surface M1 to which the excitation light (blue light BL) is incident, the surface of the third prism on a side of the second direction is the incidence and emission surface M2 from which the blue light BL having the s polarization component reflected by the polarization separation layer 436 among the blue light BL as the second colored light transmitted through the color separation layer 435 and incident to the polarization separation layer 436 is emitted to the outside and to which the fluorescent light YL and the blue light BL are incident based on the blue light BL, the surfaces of the second prism 432 and the fourth prism 434 on a side opposite to the second direction are emission surfaces M31 and M32 from which the fluorescent light YL having the p polarization component and the fluorescent light YL having the s polarization component are emitted, and the retardation layer 437 is positioned on the emission surface M31 of the fourth prism 434. Accordingly, a direction of light incident to the polarization conversion element 43 and a direction of light emitted from the polarization conversion element 43 can be defined. Therefore, it is possible to easily handle the polarization conversion element 43.

Since the retardation plate 44 is disposed between the polarization separation layer 436 of the polarization conversion element 43 and the wavelength conversion element 46, the blue light BL having the s polarization component and reflected by the polarization separation layer 436 is converted from linearly polarized light into substantially circularly polarized light rotating to the right or left (for example, to the left) and incident to the wavelength conversion element 46, when the blue light initially passes through the retardation plate 44. In regard to the blue light BL having the s polarization component, the fluorescent light YL and the blue light BL which is not converted into fluorescent light YL is reflected by the wavelength conversion element 46, converted into the substantially circularly polarized light rotating in a direction opposite to the above described right or left direction (for example, to the right), and is incident to the retardation plate 44 again. In this case, since the fluorescent light YL is polarized light having a random polarization direction having the p polarization component and the s polarization component, the fluorescent light is converted from the substantially circularly polarized light into the linearly polarized light when the fluorescent light passes through the retardation plate 44, and is incident to the polarization conversion element 43 as the linearly polarized light having the p polarization component and the s polarization component. Meanwhile, the blue light BL is converted from the substantially circularly polarized light into linearly polarized light and incident to the polarization conversion element 43 as the linearly polarized light having the p polarization component.

According to this, since the polarization direction of the blue light BL can be rotated by 90°, the blue light BL can be emitted from the emission surface M31 of the fourth prism 434 where the polarization separation layer 436 of the polarization conversion element 43 is disposed. Since the retardation layer 437 is disposed on the emission surface M31 side of the fourth prism 434, the blue light BL having the p polarization component and the fluorescent light YL having the p polarization component transmitted through the polarization separation layer 436 are emitted as the blue light BL and the fluorescent light YL having the s polarization component, and the fluorescent light YL having the s polarization component reflected by the polarization separation layer 436 is reflected by the color separation layer 435 and emitted from the emission surface M32. That is, according to this embodiment, the blue light BL can be emitted from only the emission surface M31 of the fourth prism 434 and can have aligned polarization direction of the emitted blue light BL and the fluorescent light YL.

The blue light having the p polarization component incident to the phosphor layer 463 is emitted from the phosphor layer 463 as the blue light BL and the fluorescent light YL. According to this, it is possible to efficiently generate fluorescent light YL from the excitation light (blue light BL) emitted from the array light source 411. In addition, it is possible to effectively use the blue light BL emitted from the array light source 411 without causing the blue light BL to be incident from a different incidence surface. Further, since the phosphor layer 463 and the reflecting layer 462 have fine unevenness, it is possible to increase a possibility of the diffusion of the incident blue light BL.

In this embodiment, by using the polarization conversion element 43, the light source device 4 and the lighting device 31 can be miniaturized, compared to a case where the components are provided individually. Since the lighting device 31 can be miniaturized, the projector 1 can be miniaturized.

Among the s-polarized light and p-polarized light which are included in the fluorescent light YL and incident to the polarization separation layer 436 to be separated, the s-polarized light reflected by the polarization separation layer 436 is further reflected by the color separation layer 435, and emitted in the same direction as that of the p-polarized light transmitted through the polarization separation layer 436, and thus, the fluorescent light YL can be widely emitted.

Second Embodiment

Next, a second embodiment will be described.

A projector according to this embodiment has the same configuration as that of the projector 1, but is different from the projector 1 regarding the configuration of the light source device, specifically, in a point that the light source unit 41 includes a blue light source which is different therefrom. In the following description, the same reference numerals are used for the same or substantially the same parts as the parts already described above and the description thereof will be omitted.

Figure 3:
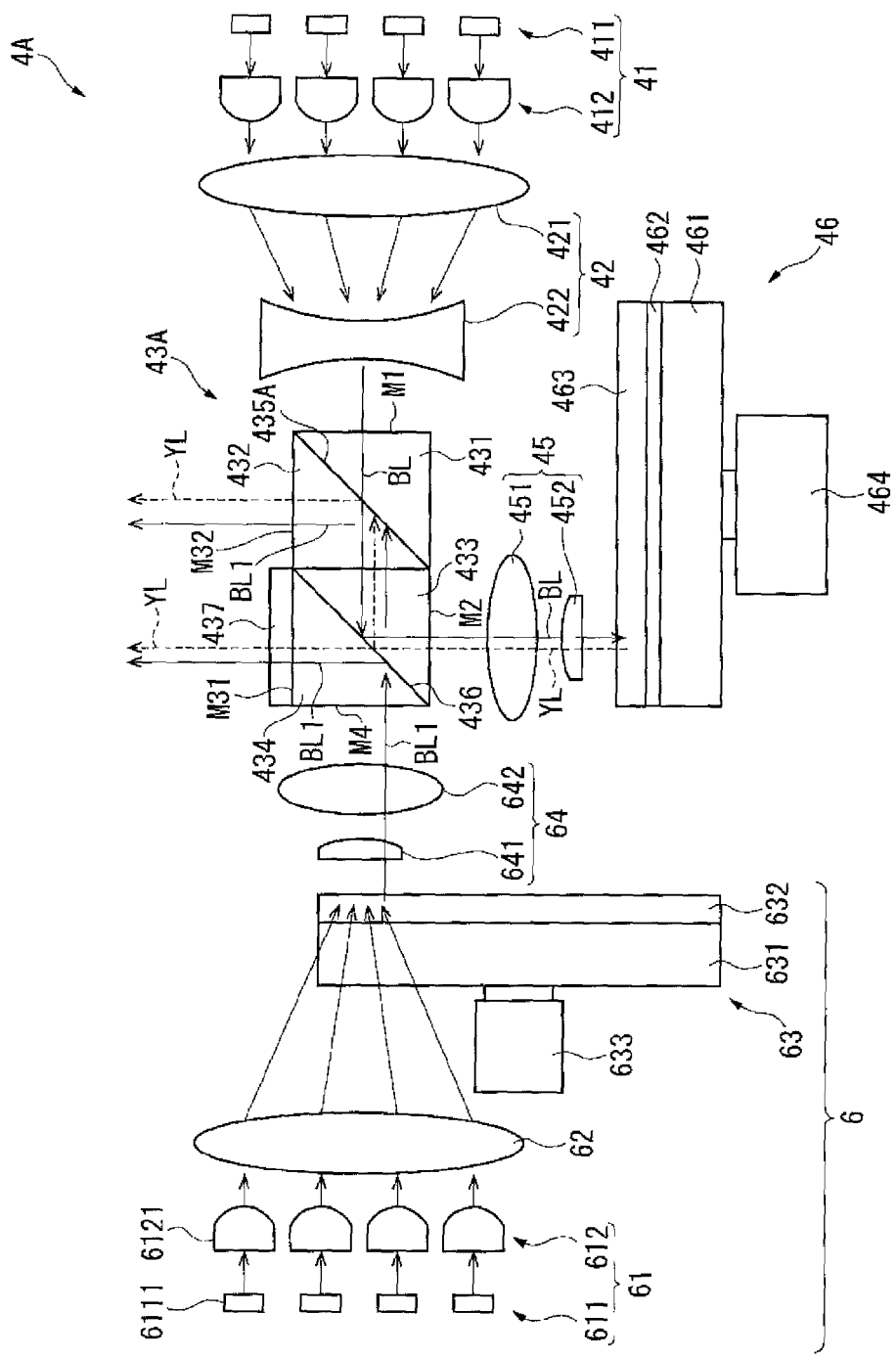
FIG. 3 is a schematic view of a light source device of a projector according to a second embodiment of the invention.

FIG. 3 is a schematic view showing an outline of a light source device 4A of the projector according to this embodiment.

In the same manner as in the light source device 4, the light source device 4A includes light source unit 41, the afocal lens 42, the pickup lens 45, and the wavelength conversion element 46, but does not include the retardation plate 44. A polarization conversion element 43A is provided instead of the polarization conversion element 43, and a blue light source unit 6 which emits blue light which is different from the excitation light (blue light BL) is provided.

Configuration of Blue Light Source Unit

The blue light source unit 6 includes a light source unit 61, a first condensing lens 62, a diffusion member 63, and a second condensing lens 64.

The light source unit 61 includes an array light source 611 and a collimator optical system 612. The array light source 611 is configured with a plurality of semiconductor lasers 6111 corresponding to the blue light source according to the invention.

The semiconductor lasers 6111 configuring the array light source 611, for example, emit blue light BL1 having a peak wavelength in a wavelength range of 460 nm. The blue light BL1 emitted from the semiconductor laser 6111 is coherent linearly polarized light having the s-polarized component and the p-polarized component and is emitted towards the first condensing lens 62. The blue light BL1 emitted from the array light source 611 is incident to the collimator optical system 612.

The collimator optical system 612 has the same configuration as that of the collimator optical system 612 and converts the blue light BL1 emitted from the array light source 611 into parallel light. The collimator optical system 612 includes a plurality of collimator lenses 6121 which are disposed in an array form to correspond to the semiconductor lasers 6111, for example. The blue light BL1 which is converted into the parallel light by passing through the collimator optical system 612 is incident to the first condensing lens 62.

The first condensing lens 62 concentrates the incident blue light BL1 towards the diffusion member 63.

The diffusion member 63 corresponds to the diffusion plate according to the invention and has a function of diffusing the incident blue light. The diffusion member 63 is disposed at a position facing the incidence surface M4 of the polarization conversion element 43A and includes a base material 631, a diffusion layer 632, and a motor 633. The base material 631 is configured with a light-transmitting base material having a substantially disc shape, and the diffusion layer 632 is formed on the surface of the base material 631 on the polarization conversion element 43A side. The diffusion layer 632 has a function of scattering the incident light.

The motor 633 is attached to the base material 631 and the base material 631 is rotated by the driving of the motor 633. Accordingly, the diffusion layer 632 is cooled.

With such a configuration, the blue light BL1 incident to the diffusion member 63 is incident to the diffusion layer 632 through the base material 631, diffused (scattered) by the diffusion layer 632, and is emitted towards the second condensing lens 64.

The second condensing lens 64 concentrates and parallelizes the blue light BL1 scattered by the diffusion layer 632. The second condensing lens 64 includes a lens 641 which concentrates the blue light BL1 and a lens 642 which parallelizes the blue light BL1 concentrated by the lens 641. Accordingly, the blue light BL1 incident to the second condensing lens 64 is emitted towards the polarization conversion element 43A in a parallelized state.

Configuration of Polarization Conversion Element

The polarization conversion element 43A has substantially the same configuration and function as those of the polarization conversion element 43, but a color separation layer 435A according to this embodiment has a configuration different from that of the color separation layer 435. The color separation layer 435A transmits blue light BL at a wavelength equal to or lower than 455 nm among the blue light BL incident from the incidence surface M1 and reflects blue light BL in a wavelength range higher than 455 nm. In this embodiment, the color separation layer 435A is configured with the dichroic mirrors.

In addition, the polarization conversion element 43A includes the incidence surface M4 to which the blue light BL1 is incident, on the surface of the fourth prism 434 on the blue light source unit 6 side. The incidence surface M4 corresponds to the second incidence surface according to the invention.

The blue light BL1 having the s polarization component among the blue light BL1 incident from the incidence surface M4 of the polarization conversion element 43A is reflected by the polarization separation layer 436 and emitted from the emission surface M31 of the fourth prism 434. The blue light BL1 having the s polarization component emitted from the emission surface M31 is incident to the retardation layer 437, the polarization direction thereof is rotated by 90°, and the blue light is emitted from the retardation layer 437 as the blue light BL1 having the p polarization component.

Meanwhile, the blue light BL1 of the p polarization component among the blue light BL1 incident from the incidence surface M4 is transmitted through the polarization separation layer 436 and incident to the color separation layer 435A through the third prism 433 and the second prism 432. Since this blue light BL1 is blue light at a wavelength of 460 nm, the blue light is reflected by the color separation layer 435A and emitted from the emission surface M32 of the second prism 432.

That is, the blue light BL1 emitted from the light source unit 61 is emitted as the blue light BL1 having the p polarization component from the emission surfaces M31 and M32 through the polarization conversion element 43A. That is, the blue light BL1 having an aligned polarization direction is emitted towards the homogenization device 5 from substantially the entire surface of the polarization conversion element 43A facing the homogenization device 5.

Meanwhile, in the same manner as in the first embodiment, the blue light BL emitted from the light source unit 41 is incident from the incidence surface M1 through the afocal lens 42, transmitted through the color separation layer 435A, reflected by the polarization separation layer 436, and emitted towards the wavelength conversion element 46 through the incidence and emission surface M2.

Here, in this embodiment, the retardation plate 44 is not provided between the polarization conversion element 43 including the incidence and emission surface M2 and the pickup lens 45. Accordingly, the blue light BL having the s polarization component is emitted from the incidence and emission surface M2 and incident to the wavelength conversion element 46 through the pickup lens 45. The fluorescent light YL based on the blue light BL is emitted from the phosphor layer 463 of the wavelength conversion element 46 and incident to the incidence and emission surface M2 through the pickup lens 45 again.

In this embodiment, since the blue light BL1 is separately emitted, in this embodiment, the blue light BL incident to the phosphor layer 463 is substantially converted into the fluorescent light YL. Since the fluorescent light YL is polarized light having a random polarization direction, the fluorescent light YL having the p polarization component among the fluorescent light YL is transmitted through the polarization separation layer 436, and in the same manner as the blue light BL, is emitted from the emission surface M31 of the fourth prism 434 through the fourth prism 434. The polarization direction of the fluorescent light YL having the p polarization component is rotated by 90° by the retardation layer 437 and the fluorescent light YL having the s polarization component is emitted from the retardation layer 437.

Meanwhile, the fluorescent light YL having the s polarization component is reflected by the polarization separation layer 436. The fluorescent light YL reflected by the polarization separation layer 436 is incident to the color separation layer 435 through the third prism 433 and the second prism 432. The fluorescent light is reflected by the color separation layer 435 and emitted from the emission surface M32 of the second prism 432. That is, the blue light BL emitted from the light source unit 41 is emitted as the fluorescent light YL having the s polarization component from the emission surfaces M31 and M32 through the polarization conversion element 43A and the wavelength conversion element 46.

With such a configuration, the blue light and the fluorescent light are emitted towards the homogenization device 5 from substantially the entire surface of the polarization conversion element 43A facing the homogenization device 5, in a state where the polarization component (p polarization component) of the blue light BL1 and the polarization component (s polarization component) of the fluorescent light YL are different from each other.

Effects of Second Embodiment

The projector according to this embodiment exhibits the same effects as those of the projector 1 and also exhibits the following effects.

Here, since the array light source 611 configuring the light source unit 61 of the blue light source unit 6 is configured with the semiconductor laser 6111, the blue light BL1 emitted from the semiconductor laser 6111 travels on a linear line. Accordingly, the light is incident to the incidence surface M4 of the polarization conversion element 43A as dots, and the blue light BL1 is included in only some rays of the emitted light from the polarization conversion element 43A.

With respect to this, according to this embodiment, the blue light BL1 is incident to the incidence surface M4 of the polarization conversion element 43A in a state where the blue light emitted from the light source unit 61 of the blue light source unit 6 is diffused. According to this, even when some rays of the blue light BL incident to the wavelength conversion element 46 is not converted into the fluorescent light YL and is not emitted as the blue light BL, it is possible to reliably emit the blue light BL1 and the fluorescent light YL from the polarization conversion element 43A.

Third Embodiment

Next, a third embodiment of the invention will be described.

A projector according to this embodiment has the same configuration as that of the projector 1, but is different from the projector 1 regarding the configuration of the light source device, specifically, in a point that a diffusion member which diffuses blue light is provided at a position facing the light source unit 41 with the polarization conversion element interposed therebetween. In the following description, the same reference numerals are used for the same or substantially the same parts as the parts already described above and the description thereof will be omitted.

Figure 4:
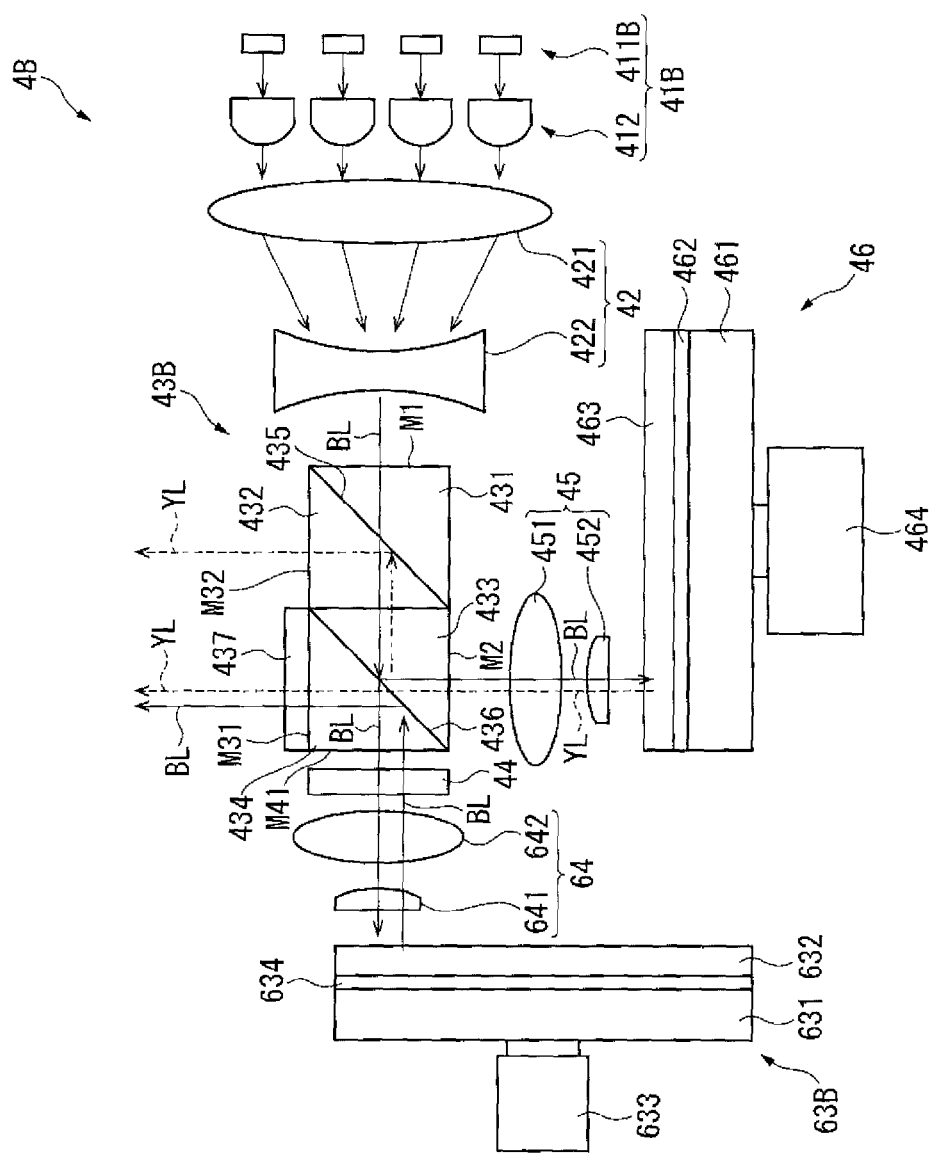
FIG. 4 is a schematic view of a light source device of a projector according to a third embodiment of the invention.

FIG. 4 is a schematic view showing an outline of a light source device 4B of the projector according to this embodiment.

In the same manner as in the light source device 4, the light source device 4B includes the afocal lens 42, the retardation plate 44, the pickup lens 45, and the wavelength conversion element 46, and also includes a light source unit 41B instead of the light source unit 41. A polarization conversion element 43B is provided instead of the polarization conversion element 43, and a diffusion member 63B to which the blue light BL having one polarization component among the excitation light (blue light BL) is incident and which diffuses the blue light BL, and the second condensing lens 64 are provided.

The light source unit 41B includes an array light source 411B which is different from the light source unit 41, and a polarization axis of the semiconductor lasers 4111 configuring the array light source 411B is previously rotated and fixed. Specifically, the blue light BL emitted from the semiconductor lasers 4111 is set to become coherent linearly polarized light having the s-polarized component and the p-polarized component.

As shown in FIG. 4, the polarization conversion element 43B has substantially the same configuration as that of the polarization conversion element 43. The polarization conversion element 43B includes an incidence and emission surface M41 of the blue light BL at a position facing the diffusion member 63B, that is, on the fourth prism 434.

Configuration of Diffusion Member

The diffusion member 63B corresponds to the diffusion reflection unit according to the invention and has a function of diffusing and reflecting the incident blue light BL. As shown in FIG. 4, the diffusion member 63B is disposed at a position facing the incidence surface M4 of the polarization conversion element 43B and includes the base material 631, the diffusion layer 632, the motor 633, and a reflecting layer 634. The base material 631 is formed in a substantially disc shape, and the reflecting layer 634 is formed on the surface of the base material 631 on the polarization conversion element 43B side. The diffusion layer 632 is formed on the surface of the reflecting layer 634 on the polarization conversion element 43B side. The diffusion layer 632 has a function of scattering the incident light.

The motor 633 is attached to the base material 631 and the base material 631 is rotated by the driving of the motor 633. Accordingly, the diffusion layer 632 is cooled.

With such a configuration, the blue light BL incident to the diffusion member 63B is incident to the diffusion layer 632, diffused (scattered) by the diffusion layer 632, reflected by the reflecting layer 634, and emitted towards the second condensing lens 64.

The retardation plate 44 and the second condensing lens 64 are disposed between the diffusion member 63B and the polarization conversion element 43B. Among these, the retardation plate 44 is disposed at a position facing the incidence and emission surface M41, unlike in the first embodiment. In this embodiment, the retardation plate 44 corresponds to a second wavelength plate.

In the light source device 4B according to this embodiment, when the blue light BL having the s polarization component and the p polarization component is emitted from the light source unit 41B, the blue light BL is incident from the incidence surface M1 through the afocal lens 42, transmitted through the color separation layer 435, and incident to the polarization separation layer 436, in the same manner as in the first embodiment.

Here, the blue light BL having the p polarization component is transmitted through the polarization separation layer 436 and emitted from the incidence and emission surface M41. The blue light BL is incident to the diffusion member 63B through the retardation plate 44 and the second condensing lens 64. The blue light BL is diffused by the diffusion layer 632 and incident to the incidence and emission surface M41 through the second condensing lens 64 and the retardation plate 44 as the blue light BL having the s polarization component. The blue light BL having the s polarization component is reflected by the polarization separation layer 436 and emitted from the emission surface M31 of the fourth prism 434. The polarization direction is rotated by 90° by the retardation layer 437 and the blue light BL having p polarization is emitted towards the homogenization device 5.

Meanwhile, the blue light BL having the s polarization component among the blue light BL emitted from the light source 41B is reflected by the polarization separation layer 436 and emitted towards the wavelength conversion element 46 through the incidence and emission surface M2.

Here, in this embodiment, the retardation plate 44 is not provided between the polarization conversion element 43B including the incidence and emission surface M2 and the pickup lens 45. Accordingly, the blue light BL having the s polarization component is emitted from the incidence and emission surface M2 and incident to the wavelength conversion element 46 through the pickup lens 45. The fluorescent light YL based on the blue light BL is emitted from the phosphor layer 463 of the wavelength conversion element 46 and incident to the incidence and emission surface M2 through the pickup lens 45 again.

In this embodiment, the blue light BL incident to the phosphor layer 463 is substantially converted into the fluorescent light YL. Since the fluorescent light YL is polarized light having a random polarization direction, the fluorescent light YL having the p polarization component among the fluorescent light YL is transmitted through the polarization separation layer 436, and in the same manner as the blue light BL, is emitted from the emission surface M31 of the fourth prism 434 through the fourth prism 434. The polarization direction of the fluorescent light YL having the p polarization component is rotated by 90° by the retardation layer 437 and the fluorescent light YL having the s polarization component is emitted from the retardation layer 437.

Meanwhile, the fluorescent light YL having the s polarization component is reflected by the polarization separation layer 436. The fluorescent light YL reflected by the polarization separation layer 436 is incident to the color separation layer 435 through the third prism 433 and the second prism 432. The fluorescent light is reflected by the color separation layer 435 and emitted from the emission surface M32 of the second prism 432. That is, the blue light BL emitted from the light source unit 41 is emitted as the fluorescent light YL having the s polarization component and the blue light BL having the p polarization component are emitted from the emission surfaces M31 and M32 through the polarization conversion element 43 and the wavelength conversion element 46.

With such a configuration, the blue light and the fluorescent light are emitted towards the homogenization device 5 from substantially the entire surface of the polarization conversion element 43B facing the homogenization device 5, in a state where the polarization component (p polarization component) of the blue light BL and the polarization component (s polarization component) of the fluorescent light YL are different from each other.

Effects of Third Embodiment

The projector according to this embodiment exhibits the same effects as those of the projector 1 and also exhibits the following effects.

In this embodiment, since the diffusion member 63B which diffuses and reflects the blue light BL which is transmitted through the polarization separation layer 436 and emitted to the outside of the polarization conversion element 43B, and the retardation plate 44 which is disposed between the polarization conversion element 43B and the diffusion member 63B are provided, the blue light BL having the p polarization component and transmitted through the polarization separation layer 436 is converted from linearly polarized light into substantially circularly polarized light rotating to the right or left (for example, to the left) and incident to the diffusion member 63B, when the blue light initially passes through the retardation plate 44. The light is reflected by the polarization separation layer 436 in a state where the second polarized light (blue light) is diffused, and is incident to the retardation plate 44 again, as substantially circularly polarized light rotating in a direction opposite to the above right or left direction (for example, to the right). In this case, the second polarized light (blue light) is converted from the substantially circularly polarized light into the linearly polarized light, and accordingly the light is incident to the polarization conversion element 43B as linearly polarized light having s polarization. The blue light BL having the s polarization incident to the polarization conversion element 43B is reflected by the polarization separation layer 436 in the direction opposite to the second direction. Accordingly, even when the blue light source unit 6 which emits the blue light BL1 is not provided, it is possible to reliably emit the blue light BL and the fluorescent light YL from the emission surfaces M31 and M32.

Fourth Embodiment

Next, a fourth embodiment will be described.

A projector according to this embodiment has the same configuration as that of the projector 1, but is different from the projector 1 regarding the configuration of the light source device, specifically, in a point that the polarization conversion element includes a reflecting layer and the wavelength conversion element includes a phosphor layer and a diffusion layer.

In the following description, the same reference numerals are used for the same or substantially the same parts as the parts already described above and the description thereof will be omitted.

Figure 5:
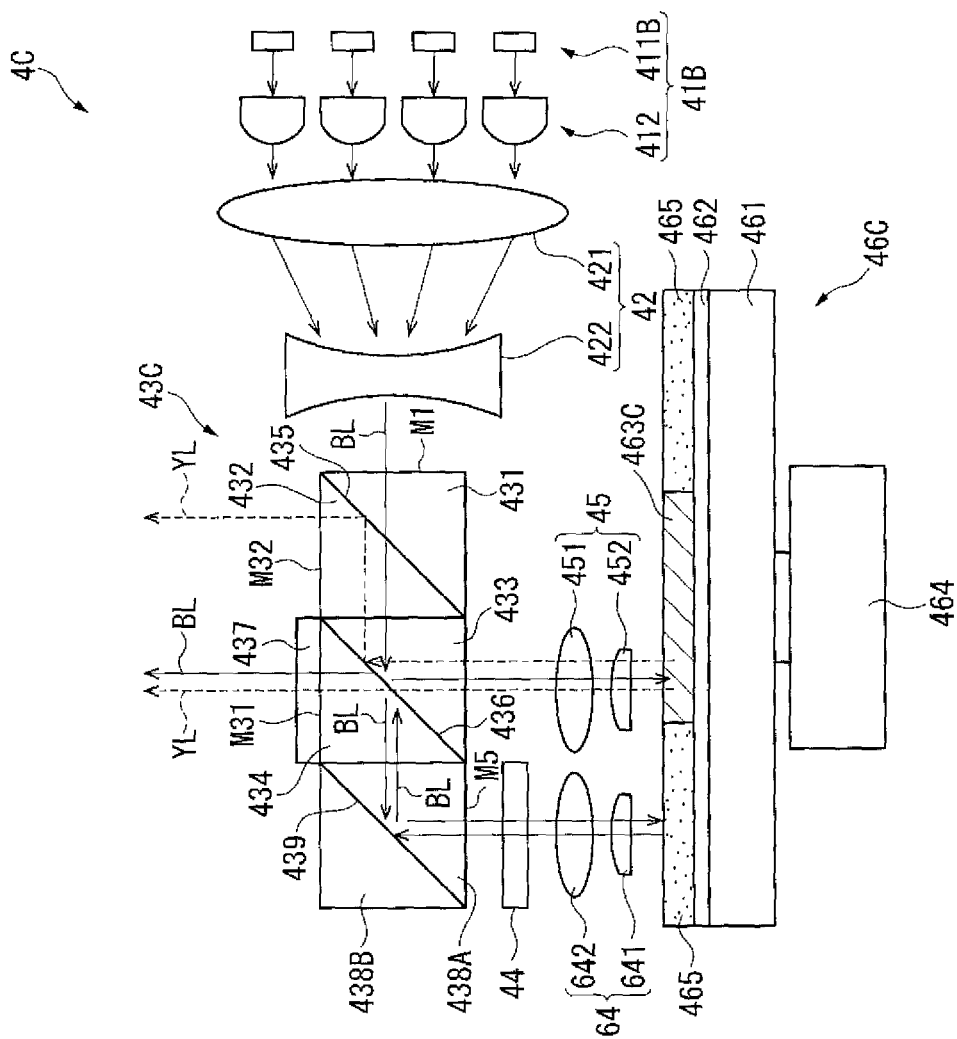
FIG. 5 is a schematic view of a light source device of a projector according to a fourth embodiment of the invention.

FIG. 5 is a schematic view showing an outline of a light source device 4C of the projector according to this embodiment.

In the same manner as in the light source device 4, the light source device 4C includes the afocal lens 42, the retardation plate 44 corresponding to the second wavelength plate according to the invention, and the pickup lens 45 and also includes the light source unit 41B instead of the light source unit 41. The light source device 4C includes the second condensing lens 64. The light source device 4C includes a polarization conversion element 43C instead of the polarization conversion element 43.

The polarization conversion element 43C includes a reflecting layer 439 to which the blue light BL having the p polarization component transmitted through the polarization separation layer 436 is incident and which reflects the blue light BL towards the wavelength conversion element 46C, and a fifth prism 438A and a sixth prism 438B including the reflecting layer 439 therein. The fifth prism 438A and the sixth prism 438B have the same shape as those of the first to fourth prisms 431 to 434 and are fixed so that inclination surfaces thereof face each other. Accordingly, the reflecting layer 439 disposed on the inclination surfaces of the fifth prism 438A and the sixth prism 438B is also inclined in the same direction as those of the color separation layer 435 and the polarization separation layer 436.

That is, in the polarization conversion element 43C, the color separation layer 435, the polarization separation layer 436, the retardation layer 437, and the reflecting layer 439 are integrally formed by the first to sixth prisms 431 to 434, 438A, and 438B.

The sixth prism 438B includes an incidence and emission surface M5 which is a surface on the second direction from which the blue light BL which is transmitted through the polarization separation layer 436 and reflected by the reflecting layer 439 is emitted and to which the light is incident again.

Figure 6:
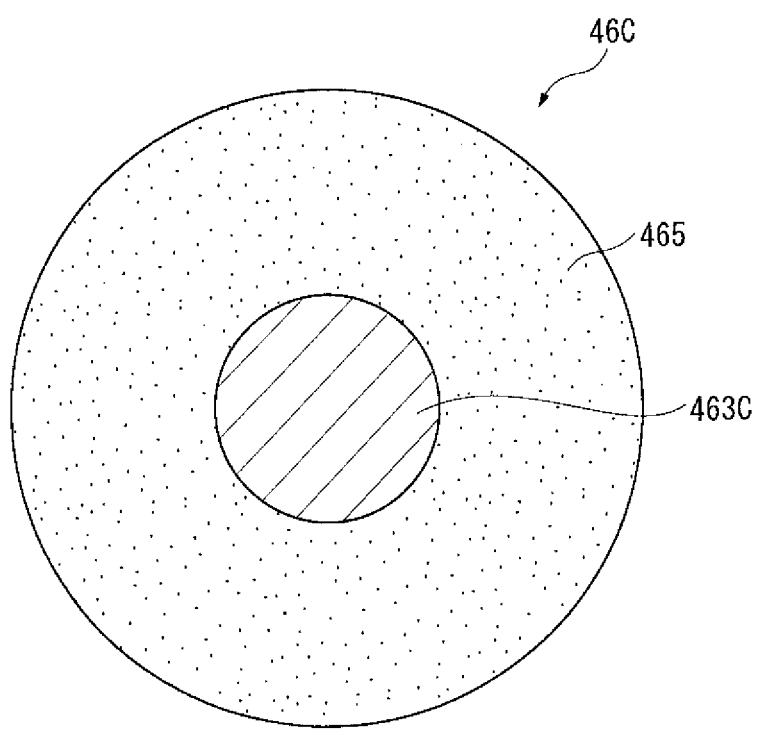
FIG. 6 is a view of a wavelength conversion element of the light source device according to the fourth embodiment viewed from a light incidence side.

FIG. 6 is a plan view of the wavelength conversion element 46C according to this embodiment viewed from a light incidence side.

The light source device 4C includes the wavelength conversion element 46C instead of the wavelength conversion element 46. As shown in FIG. 5 and FIG. 6, the wavelength conversion element 46C includes a diffusion layer 465 to which the blue light BL having the p polarization component among the excitation light (blue light BL) is incident and which diffuses the blue light BL, and a phosphor layer 463C. Specifically, the diffusion layer 465 is formed on the base material 461 in a doughnut shape and the phosphor layer 463C is formed in the center of the diffusion layer 465.

The base material 461, the reflecting layer 462, the phosphor layer 463C, and the diffusion layer 465 correspond to a phosphor wheel according to the invention.

Among these, the diffusion layer 465 corresponds to the diffusion reflection unit according to the invention and has a function of diffusing and reflecting the incident blue light BL. The diffusion layer 465 is disposed at a position facing the reflecting layer 439 of the polarization conversion element 43C, that is, the incidence and emission surface M5.

With such a configuration, the blue light BL incident to the diffusion layer 465 of the wavelength conversion element 46C is diffused (scattered) by the diffusion layer 465 and reflected by the reflecting layer 462 to be emitted towards the reflecting layer 439 through the incidence and emission surface M5.

The retardation plate 44 and the second condensing lens 64 are disposed between the diffusion layer 465 and the incidence and emission surface M5 of the polarization conversion element 43C. Among these, the retardation plate 44 is disposed at a position facing the sixth prism 438B holding the reflecting layer 439, unlike in the first embodiment.

In this embodiment, the retardation plate 44 corresponds to a second wavelength plate.

In the light source device 4C according to this embodiment, when the blue light BL having the s polarization component and the p polarization component is emitted from the light source unit 41B, the blue light BL is incident from the incidence surface M1 through the afocal lens 42, transmitted through the color separation layer 435, and incident to the polarization separation layer 436, in the same manner as in the first embodiment.

Here, the blue light BL having the p polarization component is transmitted through the polarization separation layer 436 and is incident to the reflecting layer 439 through the fourth prism 434 and the fifth prism 438A. The blue light BL reflected by the reflecting layer 439 is emitted from the incidence and emission surface M5 and is incident to the diffusion layer 465 of the wavelength conversion element 46C through the retardation plate 44 and the second condensing lens 64. The blue light BL is diffused by the diffusion layer 465 and incident to the incidence and emission surface M5 through the second condensing lens 64 and the retardation plate 44 as the blue light BL having the s polarization component. The blue light BL having the s polarization component is reflected by the reflecting layer 439 and incident to the polarization separation layer 436 through the fifth prism 438A and the fourth prism 434. The blue light BL is reflected by the polarization separation layer 436 and emitted from the emission surface M31 of the fourth prism 434. The polarization direction is rotated by 90° by the retardation layer 437 and the blue light BL having p polarization is emitted towards the homogenization device 5.

Meanwhile, the blue light BL having the s polarization component among the blue light BL emitted from the light source 41B is reflected by the polarization separation layer 436 and emitted towards the wavelength conversion element 46 through the incidence and emission surface M2. The blue light BL having the s polarization component is incident to the phosphor layer 463C of the wavelength conversion element 46C through the pickup lens 45. The fluorescent light YL based on the blue light BL is emitted from the phosphor layer 463C of the wavelength conversion element 46C and incident to the incidence and emission surface M2 through the pickup lens 45 again.

In this embodiment, the blue light BL incident to the phosphor layer 463 is substantially converted into the fluorescent light YL. Since the fluorescent light YL is polarized light having a random polarization direction, the fluorescent light YL having the p polarization component among the fluorescent light YL is transmitted through the polarization separation layer 436, and in the same manner as the blue light BL, is emitted from the emission surface M31 of the fourth prism 434 through the fourth prism 434. The polarization direction of the fluorescent light YL having the p polarization component is rotated by 90° by the retardation layer 437 and the fluorescent light YL having the s polarization component is emitted from the retardation layer 437.

Meanwhile, the fluorescent light YL having the s polarization component is reflected by the polarization separation layer 436. The fluorescent light YL reflected by the polarization separation layer 436 is incident to the color separation layer 435 through the third prism 433 and the second prism 432. The fluorescent light is reflected by the color separation layer 435 and emitted from the emission surface M32 of the second prism 432. That is, the blue light BL emitted from the light source unit 41B is emitted as the fluorescent light YL having the s polarization component and the blue light BL having the p polarization component from the emission surfaces M31 and M32 through the polarization conversion element 43 and the wavelength conversion element 46.

With such a configuration, the blue light and the fluorescent light are emitted towards the homogenization device 5 from substantially the entire surface of the polarization conversion element 43B facing the homogenization device 5, in a state where the polarization component (p polarization component) of the blue light BL and the polarization component (s polarization component) of the fluorescent light YL are different from each other.

Effects of Fourth Embodiment

The projector according to this embodiment exhibits the same effects as those of the projector 1 and also exhibits the following effects.

Since the diffusion layer 465 and the phosphor layer 463C are formed on the base material 461 of the wavelength conversion element 46C and the polarization conversion element 43C includes the reflecting layer 439 which reflects the blue light BL having the p polarization component towards the diffusion layer 465, the blue light BL having the p polarization component incident to the diffusion layer 465 is reflected towards the diffusion layer 465 and incident to the polarization separation layer 436 through the reflecting layer 439. Accordingly, both of the p polarization component and the s polarization component of the blue light BL incident to the polarization conversion element 43C are emitted in the second direction and the blue light BL having any polarization component is incident to the polarization conversion element 43C in the direction described above again, as the fluorescent light YL and the diffused blue light BL. According to this, it is possible to miniaturize the light source device 4C, compared to a case where the diffusion member 63B which diffuses the blue light BL having the p polarization component is provided in a travelling direction of the blue light BL having the p polarization component, as in the third embodiment.

Modification of Embodiments

The invention is not limited to the embodiments described above and modifications, improvements, and the like within a range of achieving the objects of the invention are included in the invention.

In the embodiments described above, the color separation layer 435 and the polarization separation layer 436 are respectively formed in the first to fourth prisms 431 to 434. However, the invention is not limited thereto. For example, at least any one of the color separation layer 435 and the polarization separation layer 436 may not be formed in the first to fourth prisms 431 to 434. In this case, the color separation layer 435, the polarization separation layer 436, and the retardation layer 437 may be integrally formed by separately providing a fixing member or the like. Even in this case, it is possible to exhibit the same effects as those in the embodiments described above.

In the fourth embodiment, the reflecting layer 439 is formed in the fifth prism 438A and the sixth prism 438B. However, the invention is not limited thereto. For example, the reflecting layer 439 may not be formed in the fifth prism 438A and the sixth prism 438B.

In the third embodiment, the polarization separation layer 436 transmits the light having p polarization component (blue light BL and fluorescent light YL), the transmitted light having p polarization component is incident to the wavelength conversion element 46, the light having s polarization component (blue light BL and fluorescent light YL) is reflected, and the reflected light having s polarization component is incident to the diffusion member 63B. However, the invention is not limited thereto. For example, the light having s polarization component may be incident to the wavelength conversion element 46 and the light having p polarization component may be incident to the diffusion member 63B. In this case, the light emitted from the light source unit 41 may be light having p polarization. Even in this case, it is possible to exhibit the same effects as those in the embodiments described above.

In the first and third embodiments, the light source devices 4, 4A, and 4B include the retardation plate 44. However, the invention is not limited thereto. For example, the light source devices 4, 4A, and 4B may not include the retardation plate 44. Even in this case, it is possible to exhibit the same effects as those in the first and third embodiments.

In the embodiments described above, the phosphor layer 463 and the reflecting layer 462 have fine unevenness. However, the invention is not limited thereto. For example, the phosphor layer 463 and the reflecting layer 462 may not have fine unevenness or may have large unevenness.

In the embodiments described above, the retardation layer 437 is disposed on the emission surface M31 side of the fourth prism 434. However, the invention is not limited thereto. For example, the retardation layer 437 may be disposed on the emission surface M32 side of the second prism 432. Even in this case, it is possible to exhibit the same effects as those in the embodiments described above. Particularly, in the projector 1 of the first embodiment, since the blue light BL having the p polarization component and the fluorescent light YL having the p polarization component can be emitted from the emission surfaces M31 and M32, the polarization directions of light emitted from the emission surfaces M31 and M32 can be aligned.

In the first embodiment, the array light source 411 emits the blue light BL having the s polarization component in a wavelength range of 445 nm. However, the invention is not limited thereto. For example, the array light source 411 may emit the blue light BL at a wavelength equal to or lower than the predetermined wavelength range, in addition to the blue light BL having the s polarization component in a wavelength range of 445 nm. In this case, since the color separation layer 435 has a configuration of reflecting the light at a wavelength lower than the predetermined wavelength of the wavelength range of the blue light BL and transmits the colored light at a wavelength equal to or higher than the predetermined wavelength, blue light including the blue light BL at a wavelength lower than the predetermined wavelength and the blue light BL at a wavelength equal to or higher than the predetermined wavelength may be incident to the color separation layer 435, to allow the blue light and the first colored light (fluorescent light YL and blue light BL) to be included in the total region of the light emitted from the polarization conversion element 43.

In the embodiments described above, the light source devices 4, 4A, 4B, and 4C include the array light sources 411 and 411B as the excitation light source and the phosphor layers 463 and 463C of the wavelength conversion element 46 include the YAG phosphor. However, the invention is not limited thereto. For example, the phosphor layers 463 and 463C may include an RG phosphor instead of the YAG phosphor. In addition, a UV light source which emits UV light may be included as the excitation light source, instead of the array light sources 411 and 411B. In this case, an RGB phosphor may be included as a phosphor.

In the embodiments described above, the optical components of the optical unit 3 are disposed as in the configuration shown in FIG. 1. However, the invention is not limited thereto. The disposition of the optical unit 3 can be suitably changed and a configuration having a substantially L shape in a plan view or a configuration having a substantially U shape in a plan view may be used, for example.

In the embodiments described above, the projector 1 includes three light modulation devices 34 (34R, 34G, and 34B), but the invention is not limited thereto. That is, the invention can be applied to a projector using two or less light modulation devices or four or more light modulation devices.

A light modulation device other than liquid crystals such as a digital micromirror device may be used as the light modulation device.

The entire disclosure of Japanese Patent Application No. 2016-001267, filed Jan. 6, 2016 is expressly incorporated by reference herein.

What is claimed is:

1. A polarization conversion element comprising:
a polarization separation layer which separates incident light into first polarized light and second polarized light which is different from the first polarized light and emits first polarized light and second polarized light in different directions, respectively;
a color separation layer which reflects first colored light among incident light and transmits second colored light which is different from the first colored light, and reflects one polarized light among the first polarized light and the second polarized light emitted from the polarization separation layer in substantially the same direction of an other polarized light among the first polarized light and the second polarized light emitted from the polarization separation layer;
a retardation layer which is disposed on an optical path of the one polarized light or the other polarized light and converts a polarization direction of incident light;
an excitation light source which emits excitation light incident to the color separation layer;
a wavelength conversion element which includes a phosphor which receives the excitation light which is transmitted through the color separation layer, reflected by the polarization separation layer, and emitted to the outside of the polarization conversion element and generates fluorescent light; and
a homogenization device which homogenizes illuminance in a plane orthogonal to a center axis of light incident from the light source device,
wherein the homogenization device includes
an afocal lens which enlarges and emits a beam system of light incident from the light source device,
a first lens array in which a plurality of first lenses are arranged in plane orthogonal to a center axis of a light flux incident through the afocal lens and which divides the incident light flux into a plurality of partial light fluxes using the plurality of first lenses,
a second lens array in which a plurality of second lenses corresponding to the plurality of first lenses are arranged in the orthogonal plane and which superimposes the plurality of partial light fluxes on an area to be lit using the plurality of second lenses, and
a superimposing lens which superimposes the light incident through the second lens array.

2. A projector comprising:
the lighting device according to claim 1,
a light modulation device which modulates light incident from the lighting device; and
a projection optical device which projects light modulated by the light modulation device.

3. A polarization conversion element comprising:
a color separation layer which reflects first colored light among incident light and transmits second colored light which is different from the first colored light;
a polarization separation layer which reflects first polarized light among incident light and transmits second polarized light which is different from the first polarized light;
a retardation layer which converts a polarization direction of incident light;
an excitation light source which emits excitation light incident to the color separation layer; and
a wavelength conversion element which includes a phosphor which receives the excitation light which is transmitted through the color separation layer, reflected by the polarization separation layer, and emitted to the outside of the polarization conversion element and generates fluorescent light,
wherein the color separation layer, the polarization separation layer, and the retardation layer are provided one by one,
the color separation layer and the polarization separation layer are disposed in series in a first direction and are inclined to the same side with respect to the first direction, respectively,
the retardation layer is disposed on an optical path of the first polarized light emitted from the polarization separation layer, the second polarized light emitted from the polarization separation layer, or the first colored light emitted from the color separation layer,
the first direction follows an optical path of the first polarized light incident to the color separation layer from the outside and is a travelling direction of the first polarized light, and
the polarization separation layer is disposed in the first direction with respect to the color separation layer and reflects the first polarized light incident along the first direction in a second direction orthogonal to the first direction.

4. The polarization conversion element according to claim 3,
wherein the color separation layer and the polarization separation layer are formed in a prism.

5. The polarization conversion element according to claim 4,
wherein the prism includes
a first prism in which the color separation layer is positioned, and
a second prism in which the polarization separation layer is positioned,
a surface of the first prism on a side opposite to the first direction is an incidence surface to which at least the second colored light is incident,
a surface of the second prism in the second direction is an incidence and emission surface from which the first polarized light reflected by the polarization separation layer among the second colored light which is transmitted through the color separation layer and incident to the polarization separation layer is emitted to the outside and to which the first colored light is entered,
surfaces of the first prism and the second prism on a side opposite to the second direction are emission surfaces from which the first polarized light and the second polarized light included in the first colored light are emitted, and
the retardation layer is positioned on the emission surface of any of the first prism and the second prism.

6. A light source device comprising:
the polarization conversion element according to claim 5,
an excitation light source which emits excitation light incident to the color separation layer;
a wavelength conversion element which includes a phosphor which receives the excitation light which passes through the color separation layer, reflected by the polarization separation layer, and emitted to the outside of the polarization conversion element and generates fluorescent light; and
a first wavelength plate which is disposed between the polarization separation layer of the polarization conversion element and the wavelength conversion element and converts any of the incident first polarized light and the second polarized light from linearly polarized light into substantially circularly polarized light, wherein the fluorescent light is incident to the polarization separation layer along an opposite direction to the second direction.

7. The light source device according to claim 6,
wherein the wavelength conversion element includes
a phosphor layer which includes the phosphor, and
a reflecting layer which reflects incident light which is transmitted through the phosphor layer, and
some rays of the first polarized light are diffused and reflected by at least any of the surface of the phosphor layer on a side opposite to the reflecting layer, the inside of the phosphor layer, the surface of the phosphor layer on the reflecting layer side, and the reflecting layer, and are emitted as blue light together with the fluorescent light.

8. The light source device according to claim 6, further comprising:
a blue light source which is disposed on a side opposite to the excitation light source with the polarization conversion element interposed therebetween and emits blue light towards a surface facing the incidence surface of the polarization conversion element; and
a diffusion plate which receives the blue light and diffuses the blue light,
wherein the polarization conversion element includes a second incidence surface to which the blue light diffused by the diffusion plate is incident.

9. The light source device according to claim 6, further comprising:
a diffusion reflection unit which diffuses and reflects the second polarized light which is transmitted through the polarization separation layer and emitted to the outside of the polarization conversion element; and
a second wavelength plate which is disposed between the polarization conversion element and the diffusion reflection unit, and converts the second polarized light from linearly polarized light into substantially circularly polarized light.

10. The light source device according to claim 9,
wherein the polarization conversion element includes
a phosphor wheel obtained by forming the phosphor layer including the phosphor and the diffusion reflection unit on the same base material, and
a reflecting layer which reflects the second polarized light towards the phosphor wheel, and
the second polarized light incident to the diffusion reflection unit of the phosphor wheel is reflected by the diffusion reflection unit and incident to the polarization separation layer through the reflecting layer.

11. A lighting device comprising:
the light source device according to claim 6; and
a homogenization device which homogenizes illuminance in plane orthogonal to a center axis of light incident from the light source device, wherein the homogenization device includes
an afocal lens which enlarges and emits a beam system of light incident from the light source device,
a first lens array in which a plurality of first lenses are arranged in plane orthogonal to a center axis of a light flux incident through the afocal lens and which divides the incident light flux into a plurality of partial light fluxes using the plurality of first lenses,
a second lens array in which a plurality of second lenses corresponding to the plurality of first lenses are arranged in the orthogonal plane and which superimposes the plurality of partial light fluxes on an area to be lit using the plurality of second lenses, and
a superimposing lens which superimposes the light incident through the second lens array.

12. A lighting device comprising:
the light source device according to claim 7; and
a homogenization device which homogenizes illuminance in plane orthogonal to a center axis of light incident from the light source device,
wherein the homogenization device includes
an afocal lens which enlarges and emits a beam system of light incident from the light source device,
a first lens array in which a plurality of first lenses are arranged in plane orthogonal to a center axis of a light flux incident through the afocal lens and which divides the incident light flux into a plurality of partial light fluxes using the plurality of first lenses,
a second lens array in which a plurality of second lenses corresponding to the plurality of first lenses are arranged in the orthogonal plane and which superimposes the plurality of partial light fluxes on an area to be lit using the plurality of second lenses, and
a superimposing lens which superimposes the light incident through the second lens array.

13. A lighting device comprising:
the light source device according to claim 8; and
a homogenization device which homogenizes illuminance in plane orthogonal to a center axis of light incident from the light source device,
wherein the homogenization device includes
an afocal lens which enlarges and emits a beam system of light incident from the light source device,
a first lens array in which a plurality of first lenses are arranged in plane orthogonal to a center axis of a light flux incident through the afocal lens and which divides the incident light flux into a plurality of partial light fluxes using the plurality of first lenses,
a second lens array in which a plurality of second lenses corresponding to the plurality of first lenses are arranged in the orthogonal plane and which superimposes the plurality of partial light fluxes on an area to be lit using the plurality of second lenses, and
a superimposing lens which superimposes the light incident through the second lens array.

* * * * *